(12) United States Patent
Inabattini et al.

(10) Patent No.: US 10,725,815 B2
(45) Date of Patent: Jul. 28, 2020

(54) REPRESENTATIVE-BASED APPROACH TO STORE HISTORICAL RESOURCE USAGE DATA

(71) Applicant: VMWARE, INC., Palo Alto, CA (US)

(72) Inventors: Sai Inabattini, Bangalore (IN); Adarsh Jagadeeshwaran, Bangalore (IN); Kalyan Saladi, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/011,660

(22) Filed: Jun. 19, 2018

(65) Prior Publication Data

US 2019/0384626 A1    Dec. 19, 2019

(51) Int. Cl.
*G06F 9/46*    (2006.01)
(52) U.S. Cl.
CPC ..................................... *G06F 9/46* (2013.01)
(58) Field of Classification Search
CPC ........................................................ G06F 9/46
See application file for complete search history.

(56) References Cited

U.S. PATENT DOCUMENTS

| | | | | |
|---|---|---|---|---|
| 7,643,428 B1* | 1/2010 | Dwekat | ................ | H04L 41/142 370/241 |
| 2011/0010222 A1* | 1/2011 | Choudhary | ............ | G06Q 10/06 705/7.37 |
| 2018/0373615 A1* | 12/2018 | Xia | ..................... | G06F 11/3452 |

* cited by examiner

*Primary Examiner* — Sisley N Kim

(57) ABSTRACT

Techniques for representative-based approach to store historical resource usage data are disclosed. In one embodiment, a management node may include a statistical representative computational unit to obtain historical resource usage data associated with a workload running on a host, divide the historical resource usage data into a plurality of pools with each pool comprising a predefined number of resource usage statistics, and determine a statistical representative corresponding to each of the pools. Each statistical representative may represent the predefined number of resource usage statistics in a corresponding one of the pools. Further, the management node may include a monitoring and managing unit to monitor and/or manage the workload using the statistical representatives.

14 Claims, 5 Drawing Sheets

REPRESENTATIVE-BASED APPROACH TO STORE HISTORICAL RESOURCE USAGE DATA

TECHNICAL FIELD

The present disclosure relates to computing environments, and more particularly to methods, techniques, and systems for storing historical resource usage data using a representative-based approach in the computing environments.

BACKGROUND

In cloud computing or client-server environments, a server, a group of servers, or a cluster of servers may communicate with multiple clients. For example, clients may include virtual machines (VMs), Internet of Things (IoT) gateways, cross cloud infra, computing devices, and the like. In client-server environments, a server may communicate with multiple clients, with each client may report performance data/metrics to the server for storage and performance analysis.

Further, resources, such as a central processing unit (CPU), memory, storage (e.g., input/output (I/O)), network, and the like, may play a role in troubleshooting any performance related issues. For example, management functions such as load balancing and resource management in a virtual infrastructure may monitor VM resource usage (e.g., CPU usage, memory usage, storage usage, network usage, and the like) and perform load balancing of the VMs across the servers, subject to a set of constraints. For example, load balancing and resource management may involve tracking the resource usage and implement any remedial actions, such as placement and live migrations of VMs. Also, management functions may include additional responsibilities such as decisions about placing a VM that is newly being powered-on onto a right server to appropriately distribute the load. In order to make such decisions effective, load-balancing and resource management algorithms may maintain and use historical resource usage data of the VMs.

Figure 1:
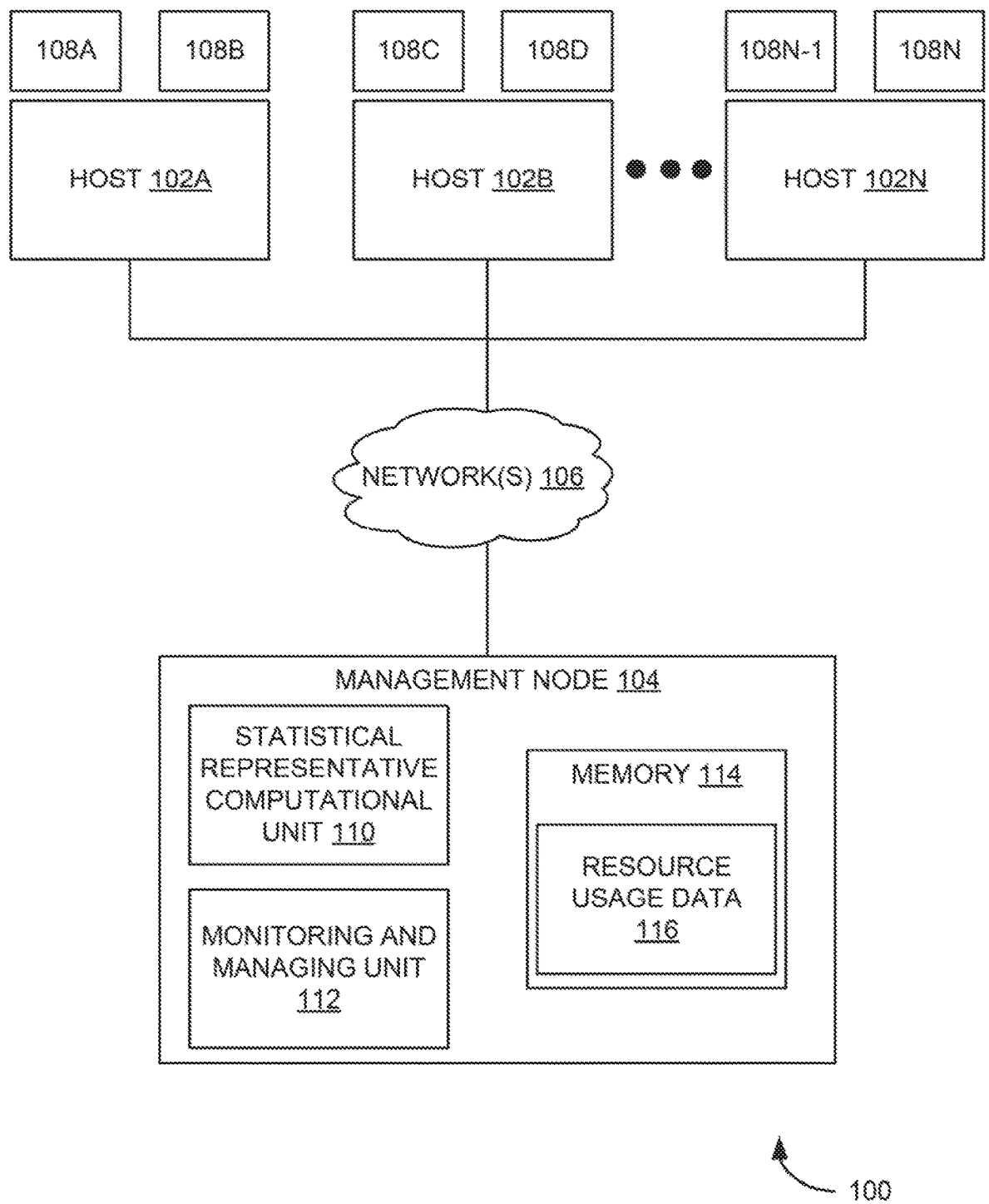
FIG. 1 is a system view of an example computing environment 100 illustrating a statistical representative computational unit to compute and store a statistical representative corresponding to each pool of historical resource usage data.

The drawings described herein are for illustration purposes only and are not intended to limit the scope of the present subject matter in any way.

DETAILED DESCRIPTION

Embodiments described herein may provide an enhanced method, technique, and system for processing and storing historical resource usage data using representative-based approach. It is often desirable to measure performance metrics in client-server systems to obtain an understanding of how the systems are operating and identify performance, availability, and responsiveness issues within the systems. In client-server environments, a server may communicate with multiple clients, with each client may collect performance metrics from underlying OS and/or services and report the data to the server for storage, analysis, and management functions.

In cloud computing environments (e.g., virtualization environments), a management node may include a load balancer and/or a resource manager to monitor resource usage (e.g., CPU usage, memory usage, storage usage, network usage, and the like) of workloads (e.g., VMs) and perform load balancing of the workloads across the hosts. For example, load balancing and resource management may involve tracking the resource usage and implement any remedial actions, such as placement and live migration of the workloads. Also, management functions may include additional responsibilities such as decisions about initial placements (i.e., placing a VM that is newly being powered-on on to a right server) to appropriately distribute the load. In order to make such decisions effective, load-balancing and resource management algorithms may maintain and use historical resource usage data of the workloads. Maintaining historical resource usage data may help to make informed decisions and avoid scenarios such as, for example, a VM having a bi-modal resource usage pattern could keep getting moved between two servers when the historical resource usage data is not considered while performing the load balancing.

As the load balancing and resource management decisions may be constrained by latency demands, data about historical resource usage statistics of the workloads can be stored in memory of the management node. In a virtual infrastructure, the management node may manage thousands of workloads. In such scenarios, storing and processing the historical resource usage statistics of such workloads may consume significant amount of compute and storage resources on the management node. For example, maintaining the historical resource usage statistics may involve memory overhead, and processing the historical resource usage statistics to make informed load balancing and resource management decisions may involve compute overhead.

Examples described herein may partition historical resource usage data associated with a workload (e.g., a VM, a container, or an application) into pools with each pool having a predefined number of resource usage statistics. Further, examples described herein may compute and store a statistical representative corresponding to each of the pools. Each statistical representative may represent/summarize the predefined number of resource usage statistics in a corresponding pool. The individual resource usage statistics associated with the pools may be discarded from the memory upon storing the statistical representatives. The workload can be monitored/managed using the statistical representatives.

Thus, examples described herein may provide a new representative-based approach to reduce the amount of historical resource usage data that can be maintained for historical workload statistics. For example, storing the statistical representatives for the pools instead of individual resource usage statistics can save compute and storage resource consumption on the management node. Further, reducing the historical resource usage data size not only reduces the memory and computation cost, but also enables to maintain historical resource usage data of longer durations at no extra cost (e.g., without or with a minimal overhead).

Examples described herein can be implemented on the fly and hence can save computational cost. Examples described herein may enable to maintain historical resource usage data for workloads for arbitrary time windows with customizable precision. Examples described herein may approximate a portion of the historical resource usage data (i.e., time window) that can be used for the management functions. Examples described herein may enable to tune the degree of precision by tuning the pool size relative to the time window of the historical resource usage data.

System Overview and Examples of Operation

FIG. 1 is a system view of an example computing environment 100 illustrating a statistical representative computational unit 110 to compute and store a statistical representative corresponding to each pool of historical resource usage data 116. Example computing environment 100 may be a cloud computing environment (e.g., virtualized cloud computing environment), which may include one or more computing platforms that support deployment, scaling, and management of workloads 108A-N (e.g., virtual machines (VMs), containers, and/or applications). One such platform is the vRealize operations (vROPs), which is commercially available from VMware. Examples described herein can be implemented in vROPs product as an optimization module which can reduce cost and memory for storing historical resource usage data. While vROPs is one example of a cloud deployment and management platform, it should be noted that any computing platform that supports the creation and deployment of workloads is within the scope of the present invention.

In some examples, computing environment 100 may be operated by a cloud computing service provider and exposed as a service available to tenants (e.g., account holders), such as enterprises. Example cloud computing platform may include, but not limited to, Amazon Web Services (AWS), Google Cloud Platform, Windows Azure, OpenStack, or any other cloud computing platform. Further, computing environment 100 may be configured to dynamically provide an enterprise or users with one or more virtual data centers in which a user may provision VMs, containers, and/or deploy multi-tier applications. Examples described herein can be implemented in load balancing and resource management of workloads in computing environment 100.

As shown in FIG. 1, computing environment 100 may include hosts 102A-N and a management node 104 that is in communication with hosts 102A-N over one or more networks 106. Each host 102A-N may refer to a physical computing device that requests services from management node 104. Each host 102A-N may execute at least one workload (e.g., workloads 108A-N) running therein. Example workload 108A-N may include an application, a VM, or a container. The VMs, in some embodiments, may operate with their own guest operating systems on a computing device using resources of the computing device virtualized by virtualization software (e.g., a hypervisor, VM monitor, and the like).

The containers, in some embodiments, may refer to software instances that enable virtualization at an operating system (OS) level. A container is a data computer node that runs on top of a host OS without the need for a hypervisor or separate OS. That is, with containerization, the kernel of the OS that manages each host 102A-N can provide multiple isolated user space instances. These instances, referred to as containers, appear as unique servers from the standpoint of an end user communicating with the containers via a network. However, from the standpoint of the OS that manages hosts 102A-N on which the containers execute, the containers may be user processes that are scheduled and dispatched by the OS.

Management node 104 may refer to a computing device or computer program (i.e., executing on a computing device) that provides some service to hosts 102A-N or client programs executing on hosts 102A-N. Management node 104 may connect to the cloud deployment platforms either directly or over communication links. In the example shown in FIG. 1, hosts 102A-N and management node 104 may communicate over a network(s) 106. Communication is according to a protocol, which may be a message-based protocol.

Example network 106 can be a managed Internet protocol (IP) network administered by a service provider. For example, network 106 may be implemented using wireless protocols and technologies, such as WiFi, WiMax, and the like. In other examples, network 106 can also be a packet-switched network such as a local area network, wide area network, metropolitan area network, Internet network, or other similar type of network environment. In yet other examples, network 106 may be a fixed wireless network, a wireless local area network (LAN), a wireless wide area network (WAN), a personal area network (PAN), a virtual private network (VPN), intranet or other suitable network system and includes equipment for receiving and transmitting signals. Network 106 can also have a hard-wired connection to hosts 102A-N.

Examples described in FIG. 1 may depict management node 104 in communication with multiple hosts 102A-N, however, in some examples, a group of management nodes or a cluster of management nodes can communicate with multiple hosts 102A-N over one or more networks to provide services to hosts 102A-N. Management node 104 can be a service process in a management application or can be an appliance running in the data center to cater multiple management applications in a cloud-based environment. For example, management application may be vSphere virtual center that is offered by VMware. In some examples, management application can be provided in a physical server, VM, or container.

Management node 104 may include a statistical representative computational unit 110, a monitoring and managing unit 112, and memory 114 to store resource usage data 116. Memory 114 may be an internal memory, or an external storage device connected to management node 104. In other examples, statistical representative computational unit 110 and monitoring and managing unit 112 can be implemented on different nodes/servers. One skilled in the art can appreciate that statistical representative computational unit 110 and monitoring and managing unit 112 can also be provided in a VM or virtual application that can run on any host computing system and can be provided to a user through a graphical user interface as a part of management software.

For example, statistical representative computational unit 110 and monitoring and managing unit 112 may each be any combination of hardware and programming to implement the functionalities described herein. In some implementations, the programming may be processor executable instructions stored on a non-transitory machine-readable storage medium, and the hardware may include at least one processing resource to retrieve and/or execute those instructions. Example processing resources include a microcontroller, a microprocessor, central processing unit core(s), an application-specific integrated circuit (ASIC), a field programmable gate array (FPGA), etc. Example non-transitory machine-readable medium include random access memory (RAM), read-only memory (ROM), electrically erasable programmable read-only memory (EEPROM), flash memory, a hard disk drive, etc. The term "non-transitory" does not encompass transitory propagating signals. Additionally or alternatively, statistical representative computational unit 110 and monitoring and managing unit 112 may each include electronic circuitry or logic for implementing functionalities described herein.

During operation, statistical representative computational unit 110 may obtain historical resource usage data 116 associated with a workload (e.g., workload 108A) running on a host (e.g., host 102A). For example, management node 104 may receive resource usage data 116 including resource usage statistics of workloads 108A-N and store resource usage data 116 in memory 114 for further analysis and management functions. In this example, statistical representative computational unit 110 may retrieve resource usage data 116 from memory 114. Resource usage data 116 may be associated with a plurality of resources that may be consumed by workloads 108A-N on hosts 102A-N. For example, resource usage data 116 may include central processing unit (CPU) usage data, memory usage data, storage usage data, cache usage data, or network bandwidth usage data. Example storage usage data may include disk input/output (I/O) usage data and disk space usage data.

Further, statistical representative computational unit 110 may divide historical resource usage data 116 into a plurality of pools with each pool comprising a predefined number of resource usage statistics. For example, historical resource usage data 116 may be divided into the plurality of pools at regular intervals of time. In other examples, each pool may include an equal number of resource usage statistics. The size of the pools may depend on a type of the management function that is used to monitor resource usage of workloads 108A-N.

Furthermore, statistical representative computational unit 110 may determine a statistical representative corresponding to each of the pools. The statistical representative may represent/summarize the predefined number of resource usage statistics in a corresponding one of the pools. Example statistical representative may include at least one mathematical function such as a mean ($\mu$), a standard deviation ($\sigma$), and/or a $99^{th}$ percentile. In one example, each statistical representative may include a pair of mean and standard deviation of the resource usage statistics in a corresponding pool. In another example, each statistical representative may include a pair of mean and $99^{th}$ percentile of the resource usage statistics in a corresponding pool.

In one example, statistical representative computational unit 110 may store the statistical representative corresponding to each of the plurality of pools in memory 114 associated with management node 104 and discard the resource usage statistics associated with the plurality of pools from memory 114 upon storing the statistical representative corresponding to each of the plurality of pools. Thus, statistical representative computational unit 110 may provide a statistical representative-based approach to reduce the amount of historical resource usage data 116 that can be maintained for historical workload statistics.

Further during operation, monitoring and managing unit 112 may monitor and/or manage the workload using the statistical representatives. Examples for monitoring the workload may include monitoring resource usage of workload 108 and managing the workload may include load balancing and/or resource management of workloads 108 in computing environment 100.

Further during operation, statistical representative computational unit 110 may dynamically update the statistical representatives corresponding to the pools upon receiving new resource usage data. In one example, statistical representative computational unit 110 may receive a first incoming resource usage statistic associated with the workload, place the first incoming resource usage statistic in a new pool, and determine a new statistical representative for the new pool. In this example, statistical representative computational unit 110 may update the new statistical representative corresponding to the new pool for each of incoming resource usage statistics until the number of the incoming resource usage statistics in the new pool is less than the predefined number of resource usage statistics per pool.

In another example, statistical representative computational unit 110 may dynamically update the statistical representatives corresponding to the plurality of pools by storing the new statistical representative corresponding to the new pool in memory 114 of management node 104 and discarding an oldest statistical representative from memory 114 when the number of incoming resource usage statistics in the new pool is equal to the predefined number of resource usage statistics. Dynamically updating the statistical representatives is explained in FIGS. 2A-2D.

Figure 2A:
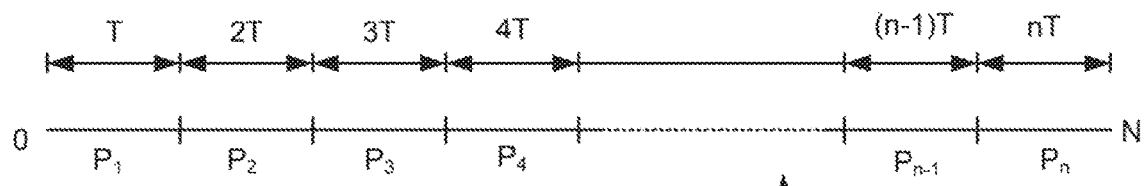
FIG. 2A is an example schematic diagram illustrating dividing historical resource usage data corresponding to a time window into a plurality of pools.

FIG. 2A is an example schematic diagram 200A illustrating dividing historical resource usage data corresponding to a time window into a plurality of pools. Consider a time line size (i.e., time window) of historical resource usage data is N minutes with one sample (i.e., resource usage statistic) per minute. The "N" minutes of historical resource usage data may be divided into n pools (e.g., $P_1$ to $P_n$). In this example, the size of each pool is t, where t=N/n. Further, each pool may include a predefined number of samples.

Figure 2B:
FIG. 2B is an example schematic diagram illustrating determining a statistical representative corresponding to each of the pools.

FIG. 2B is an example schematic diagram 200B illustrating determining a statistical representative corresponding to each of the pools $P_1$ to $P_n$. The statistical representatives $R_1$ to $R_n$ corresponding to pools $P_1$ to $P_n$ may be computed. In this example, the t samples (i.e., resource usage statistics) in each pool can be represented by a single statistical representative. As shown in FIG. 2B, the historical resource usage data of pool $P_1$ from 0 to t minutes is represented by $R_1$, historical resource usage data of pool $P_2$ from t to 2t minutes is represented by $R_2$, historical resource usage data of pool $P_n$ from (n-1)t to nt minutes is represented by $R_n$, and the like. Thus, the resource usage statistics corresponding to the time window can be reduced to a few statistical representatives of the historical resource usage data. Individual samples in the pools $P_1$ to $P_n$ may be discarded once the statistical representatives $R_1$ to $R_n$ for pools $P_1$ to $P_n$ are computed and stored.

Example statistical representative of a pool can be any pre-defined statistical metric, such as a mean of samples in the pool, a standard deviation of samples in the pool, a 99th percentile, and the like. In one example, resource management systems can use the mean and the standard deviation as statistical representatives for a given pool for decision making. For each pool ($P_i$), a pair of mean ($\mu$) and standard deviation ($\sigma$) of the samples in that pool can be maintained as follows.

Statistical representative, $R_i = (P_{i\mu}, P_{i\sigma})$, where $P_{i\mu}$ is the mean of samples in pool $P_i$ and $P_{i\sigma}$ is the standard deviation of samples in pool $P_i$.

Figure 2C:
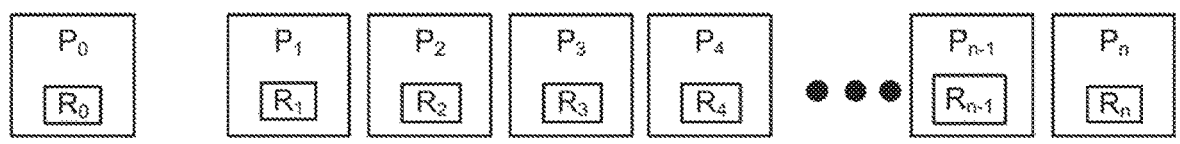
FIG. 2C is an example schematic diagram illustrating updating a new statistical representative corresponding to a new pool for each of incoming resource usage statistics.
Figure 2D:
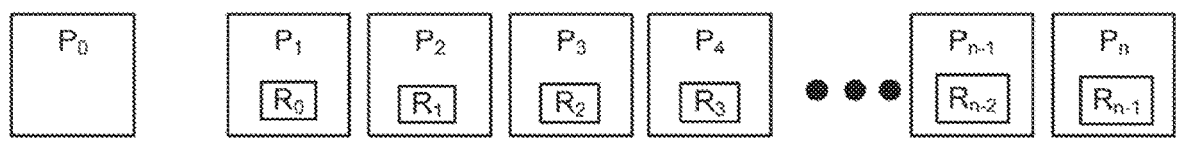
FIG. 2D is an example schematic diagram illustrating updating the statistical representatives corresponding to the plurality of pools.

Further, the statistical representatives can be updated at regular intervals as shown in FIGS. 2C and 2D. FIG. 2C is an example schematic diagram 200C illustrating updating a new statistical representative corresponding to a new pool for each of incoming resource usage statistics. Updating the statistical representatives may be critical in maintaining the accuracy of the historical resource usage data. In one example, when a new sample comes in (e.g., assuming one sample per minute), the historical resource usage data in the pools become older by a minute. In this example, a new pool $P_0$ may be created and the new sample can be placed in new pool $P_0$. Further, a new statistical representative $R_0$ may be determined for new pool $P_0$ having the new sample. New statistical representative $R_0$ may represent the samples in new pool $P_0$. New statistical representative $R_0$ can be updated for each new incoming sample in new pool $P_0$ until the number of the incoming samples (c) in the new pool is less than pool size t.

FIG. 2D is an example schematic diagram 200D illustrating updating the statistical representatives corresponding to the plurality of pools. When the number of incoming samples (c) reaches pool size t, the pool representatives $R_0$ to $R_{n-1}$ can be shifted to right (e.g., as shown in FIG. 2D). In this case, as shown in FIG. 2D, $R_0$ replaces $R_1$, $R_1$ replaces $R_2$, $R_2$ replaces $R_3$, and $R_{n-1}$ replaces $R_n$. Further, the oldest statistical representative $R_n$ can be discarded and the statistical representative for new pool $P_0$ can be reset. Thus, a statistical representative can be discarded after every t new samples of resource usage data.

Thus, examples described herein can ensure that the representatives from pools $P_0$ to $P_{n-1}$ may have substantially accurate data. Further, a possible error in the computation of statistical representatives may come from $P_n$ as the oldest statistical representative may not be discarded until the new pool receives the t new samples. After each new sample s, the new statistical representative $R_0$ (e.g., mean ($P_{0\mu}$) and standard deviation ($P_{0\sigma}$)) of the new pool ($P_0$) may be updated using the following equation:

$$P_{0\mu} = \frac{P_{0\mu} * c + s}{c+1}, \quad P_{0\sigma} = \sqrt{\frac{P_{0\sigma}^2 * c + (P_{0\mu} - s)^2}{c+1}},$$

where c is the number of incoming samples in pool $P_0$ and s is the new sample in pool $P_0$.

Further, the statistical representatives for pools $P_0$ to $P_n$ may be updated (e.g., by right shifting the statistical representatives) when c=t. Further, the mean and standard deviation may be computed for overall data (e.g., historical resource usage data for last N minutes). Since each statistical representative may represent t minutes of time in the time window, the mean and the standard deviation of overall data can be computed as a composite mean and a composite standard deviation of statistical pool representatives $R_0$ to $R_n$.

For example, the composite mean for the last N minutes (e.g., where N=n times t (i.e., on the timeline N minutes span n pools)) of the historical usage data may be computed using the following equation:

$$\text{Composite mean}, \delta = \frac{S1 + S2 + S3}{N},$$

where, S1 is the sum of samples from pools $P_1$ to $P_{n-1}$, S2 is the sum of newly arrived samples in pool $P_0$, S3 is the sum of remaining samples from pool $P_n$, and N is the time window of the historical resource usage data.

In one example, S1, S2 and S3 can be computed using the following equations:

$$S1 = \Sigma_{i=1}^{n-1} P_{i\mu} * t,$$

$$S2 = P_{0\mu} * c, \text{ and}$$

$$S3 = P_{n\mu} * (t-c),$$

where t is the number of samples in each pool and c is the count of incoming samples in pool $P_0$.

Further, the standard deviation for the last N minutes (e.g., where N=n times t (i.e., on the timeline N minutes span n pools)) is computed using the following equation:

$$\text{Composite standard deviation} = \sqrt{\frac{SS1 + SS2 + SS3}{N-1}},$$

where SS1 is the squared sum of samples from pools $P_1$ to $P_{n-1}$, SS2 is the squared sum of newly arrived samples in pool $P_0$, SS3 is the squared sum of remaining samples from pool $P_n$, and N is the time window of the historical resource usage data.

In one example, SS1, SS2 and SS3 can be computed using the following equations:

$$SS1 = \Sigma_{i=1}^{n-1} P_{i\sigma}^2 * (t-1) + (\delta - P_{i\mu})^2 * t,$$

$$SS2 = P_{0\sigma}^2 * (c-1) + (\delta - P_{0\mu})^2 * c, \text{ and}$$

$$SS3 = P_{n\sigma}^2 * (t-c-1) + (\delta - P_{n\mu})^2 * (t-c),$$

where t is the number of samples in each pool, $\delta$ is the composite mean, c is the count of incoming samples in pool $P_0$, which can be reset to 0 once the count reaches t.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 3A:
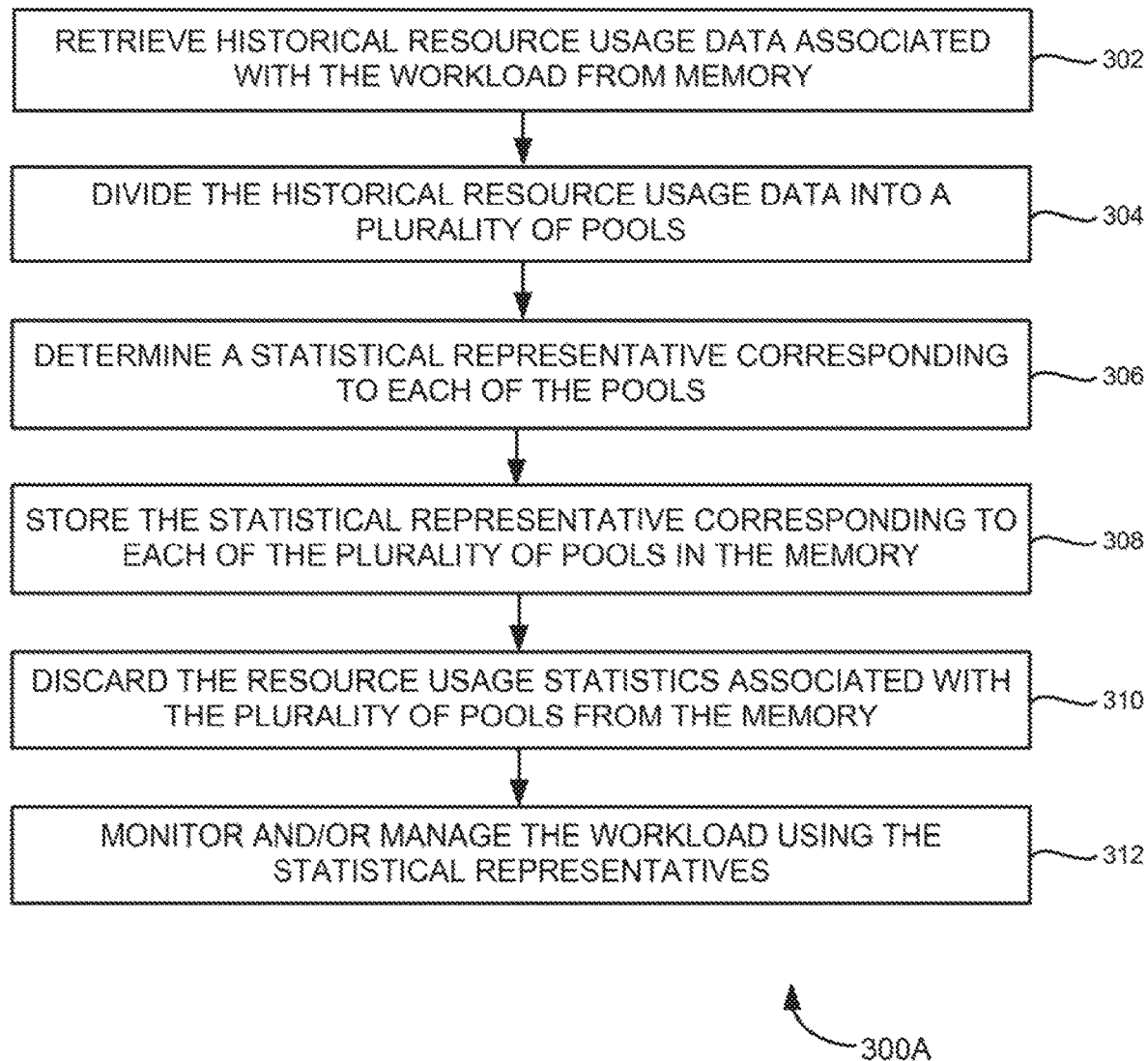
FIG. 3A is an example flow diagram illustrating managing a workload in a computing environment based on statistical representatives corresponding to pools.
Figure 3B:
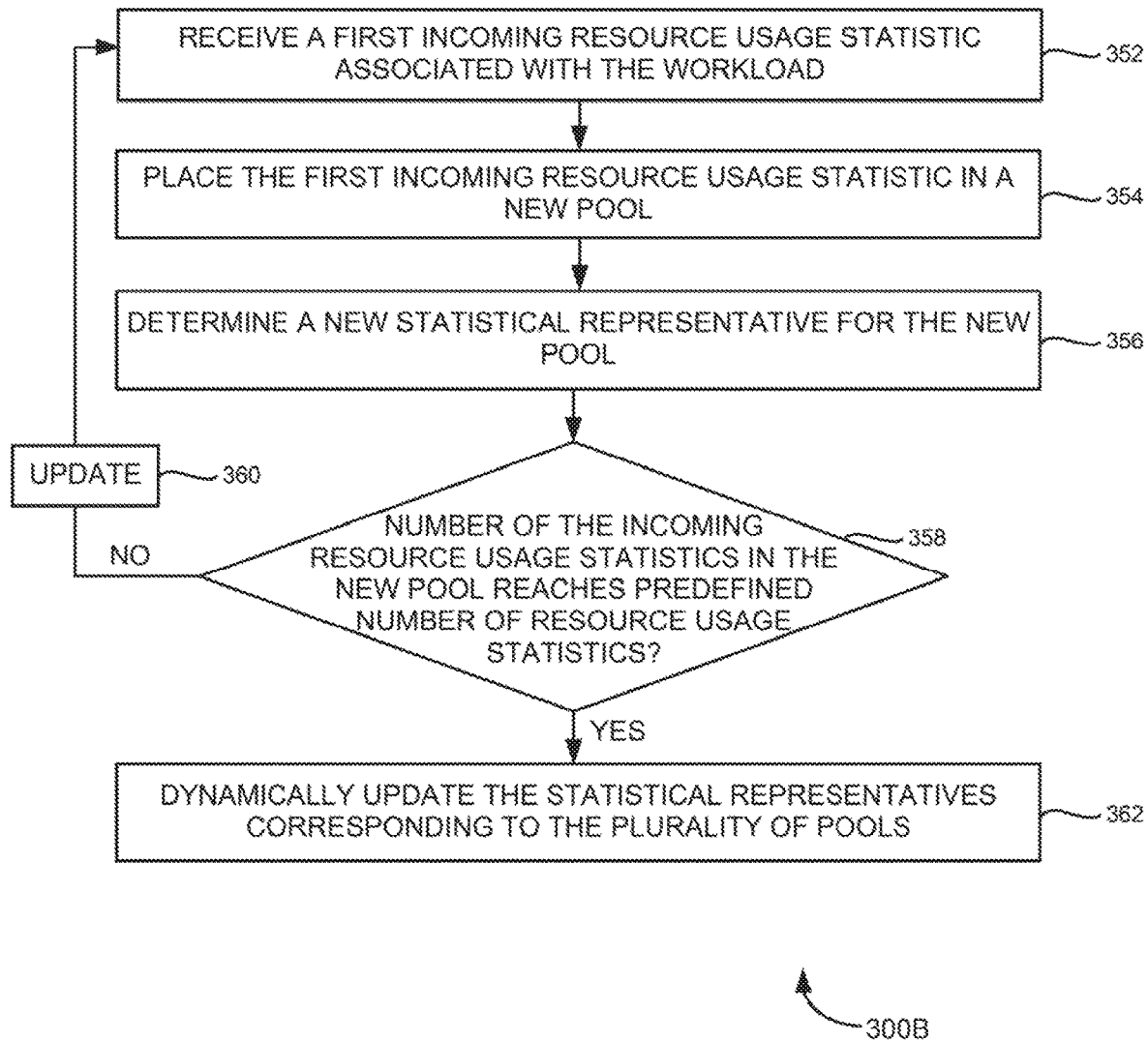
FIG. 3B is an example flow diagram illustrating updating the statistical representatives corresponding to the pools upon receiving new resource usage data.

FIG. 3A is an example flow diagram 300A illustrating managing a workload in a computing environment based on statistical representatives corresponding to pools. FIG. 3B is an example flow diagram 300B illustrating updating the statistical representatives corresponding to the pools upon receiving new resource usage data. It should be understood that the processes depicted in FIGS. 3A and 3B represent generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

Referring to FIG. 3A, at 302, historical resource usage data associated with a workload may be retrieved from memory associated with a management node. In some examples, the workload may be running in a cloud computing system or a virtualized computing system. Example workload may include an application, a VM, or a container. Example historical resource usage data comprises central processing unit (CPU) usage data, memory usage data, storage usage data, cache usage data, or network bandwidth usage data.

At 304, the historical resource usage data may be divided into a plurality of pools with each pool comprising a predefined number of resource usage statistics. At 306, a statistical representative corresponding to each of the pools may be determined. In one example, each statistical representative may represent the predefined number of resource usage statistics in a corresponding one of the pools.

At 308, the statistical representative corresponding to each of the plurality of pools may be stored in the memory. At 310, the resource usage statistics associated with the plurality of pools can be discarded from the memory upon storing the statistical representative corresponding to each of the plurality of pools. At 312, the workload can be monitored or managed using the statistical representatives. Further, the statistical representatives corresponding to the pools can be dynamically updated upon receiving new resource usage data as explained in FIG. 3B.

Referring to FIG. 3B, at 352, a first incoming resource usage statistic associated with the workload may be received, for instance, in real-time. At 354, the first incoming resource usage statistic can be placed/stored in a new pool. At 356, a new statistical representative may be determined for the new pool.

At 358, a check is made to determine whether a number of the incoming resource usage statistics in the new pool reaches the predefined number of resource usage statistics. At 360, the new statistical representative corresponding to the new pool may be updated for each of incoming resource usage statistics until a number of the incoming resource usage statistics in the new pool is less than the predefined number of resource usage statistics.

At 362, the statistical representatives corresponding to the plurality of pools may be dynamically updated by storing the new statistical representative corresponding to the new pool in the memory and discarding an oldest statistical representative from the memory when the number of incoming resource usage statistics in the new pool reaches the predefined number of resource usage statistics.

Figure 4:
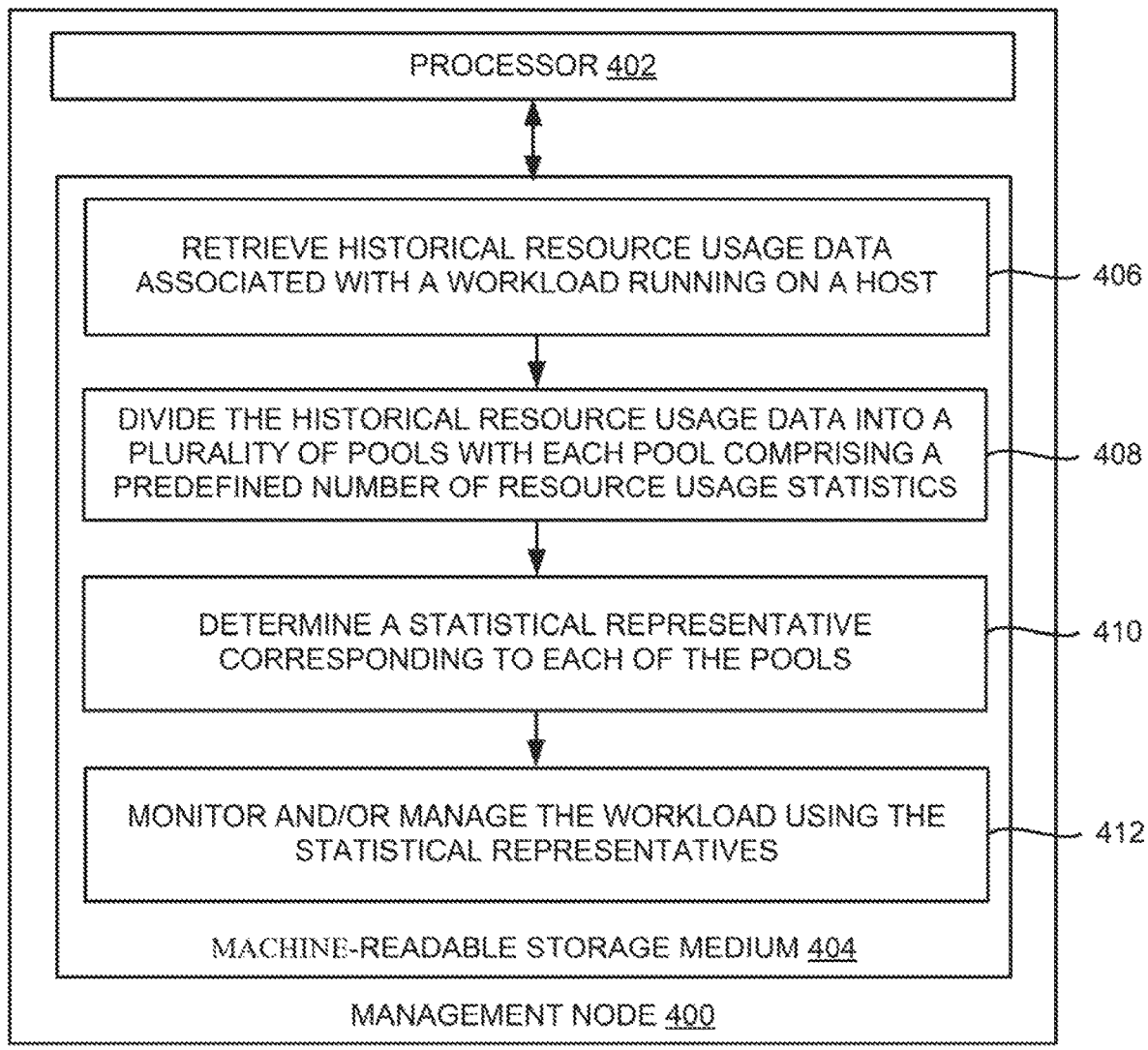
FIG. 4 is a block diagram of an example management node including non-transitory computer-readable storage medium, storing instructions to monitor and/or manage a workload using statistical representatives.

FIG. 4 is a block diagram of an example management node 400 including non-transitory machine-readable storage medium 404, storing instructions to monitor and/or manage a workload using the statistical representatives. Management node 400 may include a processor 402 and a machine-readable storage medium 404 communicatively coupled through a system bus. The processor 402 may be any type of central processing unit (CPU), microprocessor, or processing logic that interprets and executes machine-readable instructions stored in the machine-readable storage medium 404. The machine-readable storage medium 404 may be a random-access memory (RAM) or another type of dynamic storage device that may store information and machine-readable instructions that may be executed by the processor 402. For example, the machine-readable storage medium 404 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 404 may be a non-transitory machine-readable medium. In an example, the machine-readable storage medium 404 may be remote but accessible to management node 400.

The machine-readable storage medium 404 may store instructions 406-412. In an example, instructions 406-412 may be executed by processor 402 for managing a workload using the statistical representatives. Instructions 406 may be executed by processor 402 to retrieve historical resource usage data associated with a workload running on a host.

Instructions 408 may be executed by processor 402 to divide the historical resource usage data into a plurality of pools with each pool comprising a predefined number of resource usage statistics. Instructions 410 may be executed by processor 402 to determine a statistical representative corresponding to each of the pools. In one example, each statistical representative may represent the predefined number of resource usage statistics in a corresponding one of the pools. Instructions 412 may be executed by processor 402 to monitor and/or manage the workload using the statistical representatives. Example monitoring may include monitoring resource usage of the workload and example managing may include resource management and/or load balancing of the workload in a cloud computing system.

Thus, the statistical representatives-based approach for processing historical resource usage statistics can significantly reduce the computation time and space (e.g., memory) required by load balancing and resource management systems. Using the statistical representatives-based approach, load balancing and resource management systems can also maintain longer history about VM resource usage statistics at no additional cost. Even though FIGS. 1-4 describes about resource usage data, examples described herein can also be implemented for any other type of data that may be stored as a statistical data in memory.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A management node comprising:
   a statistical representative computational unit to:
      obtain historical resource usage data associated with a workload running on a host;
      divide the historical resource usage data into a plurality of pools with each pool comprising a predefined number of resource usage statistics;
      determine a statistical representative corresponding to each of the pools, wherein each statistical representative is to represent the predefined number of resource usage statistics in a corresponding one of the pools;
      store the statistical representative corresponding to each of the plurality of pools in memory associated with the management node;
      discard the resource usage statistics associated with the plurality of pools from the memory upon storing the statistical representative corresponding to each of the plurality of pools; and
      dynamically update the statistical representatives corresponding to the plurality of pools upon receiving new resource usage data by storing a new statistical representative corresponding to a new pool of the new resource usage data in the memory and discarding an oldest statistical representative from the memory; and
   a monitoring and managing unit to:
      monitor and/or manage the workload using the statistical representatives.

2. The management node of claim 1, wherein the workload comprises an application, a virtual machine, or a container.

3. The management node of claim 1, wherein the historical resource usage data comprises central processing unit (CPU) usage data, memory usage data, storage usage data, cache usage data, or network bandwidth usage data.

4. The management node of claim 1, wherein the statistical representative comprises at least one of a mean, a standard deviation, and a $99^{th}$ percentile.

5. A management node comprising:
   a statistical representative computational unit to:
      obtain historical resource usage data associated with a workload running on a host;
      divide the historical resource usage data into a plurality of pools with each pool comprising a predefined number of resource usage statistics; and
      determine a statistical representative corresponding to each of the pools, wherein each statistical representative is to represent the predefined number of resource usage statistics in a corresponding one of the pools; and
   a monitoring and managing unit to:
      monitor and/or manage the workload using the statistical representatives, wherein the statistical representative computational unit is to dynamically update the statistical representatives corresponding to the pools upon receiving new resource usage data, by:
         receiving a first incoming resource usage statistic associated with the workload;
         placing the first incoming resource usage statistic in a new pool;
         determining a new statistical representative for the new pool; and
         updating the new statistical representative corresponding to the new pool for each of incoming resource usage statistics until a number of the incoming resource usage statistics in the new pool is less than the predefined number of resource usage statistics.

6. The management node of claim 5, wherein the statistical representative computational unit is to:
   dynamically update the statistical representatives corresponding to the plurality of pools by storing the new statistical representative corresponding to the new pool in memory of the management node and discarding an oldest statistical representative from the memory when the number of incoming resource usage statistics in the new pool is equal to the predefined number of resource usage statistics.

7. A computer-implemented method for managing a workload in a computing environment, comprising:
   retrieving historical resource usage data associated with the workload from memory;
   dividing the historical resource usage data into a plurality of pools with each pool comprising a predefined number of resource usage statistics;
   determining a statistical representative corresponding to each of the pools, wherein each statistical representative is to represent the predefined number of resource usage statistics in a corresponding one of the pools;
   storing the statistical representative corresponding to each of the plurality of pools in the memory;
   discarding the resource usage statistics associated with the plurality of pools from the memory upon storing the statistical representative corresponding to each of the plurality of pools;

dynamically updating the statistical representatives corresponding to the plurality of pools upon receiving new resource usage data by storing a new statistical representative corresponding to a new pool of the new resource usage data in the memory and discarding an oldest statistical representative from the memory; and
monitoring and/or managing the workload using the statistical representatives.

8. The method of claim 7, wherein the workload comprises an application, a virtual machine, or a container, and wherein the historical resource usage data comprises central processing unit (CPU) usage data, memory usage data, storage usage data, cache usage data, or network bandwidth usage data.

9. A computer-implemented method for managing a workload in a computing environment, comprising:
retrieving historical resource usage data associated with the workload from memory;
dividing the historical resource usage data into a plurality of pools with each pool comprising a predefined number of resource usage statistics;
determining a statistical representative corresponding to each of the pools, wherein each statistical representative is to represent the predefined number of resource usage statistics in a corresponding one of the pools;
monitoring and/or managing the workload using the statistical representatives; and
dynamically updating the statistical representatives corresponding to the pools upon receiving new resource usage data, wherein dynamically updating the statistical representatives comprises:
receiving a first incoming resource usage statistic associated with the workload;
placing the first incoming resource usage statistic in a new pool;
determining a new statistical representative for the new pool; and
updating the new statistical representative corresponding to the new pool for each of incoming resource usage statistics until a number of the incoming resource usage statistics in the new pool is less than the predefined number of resource usage statistics.

10. The method of claim 9, further comprising:
dynamically updating the statistical representatives corresponding to the plurality of pools by storing the new statistical representative corresponding to the new pool in the memory and discarding an oldest statistical representative from the memory when the number of incoming resource usage statistics in the new pool is equal to the predefined number of resource usage statistics.

11. A non-transitory machine-readable storage medium encoded with instructions that, when executed by a processor of a management node, cause the processor to:
retrieve historical resource usage data associated with a workload running on a host;
divide the historical resource usage data into a plurality of pools with each pool comprising a predefined number of resource usage statistics;
determine a statistical representative corresponding to each of the pools, wherein each statistical representative is to represent the predefined number of resource usage statistics in a corresponding one of the pools;
store the statistical representative corresponding to each of the plurality of pools in memory associated with the management node;
discard the resource usage statistics associated with the plurality of pools from the memory upon storing the statistical representative corresponding to each of the plurality of pools;
dynamically update the statistical representatives corresponding to the plurality of pools upon receiving new resource usage data by storing a new statistical representative corresponding to a new pool of the new resource usage data in the memory and discarding an oldest statistical representative from the memory; and
monitor and/or manage the workload using the statistical representatives.

12. The non-transitory machine-readable storage medium of claim 11, wherein the workload comprises an application, a virtual machine, or a container, and wherein the historical resource usage data comprises central processing unit (CPU) usage data, memory usage data, storage usage data, cache usage data, or network bandwidth usage data.

13. A non-transitory machine-readable storage medium encoded with instructions that, when executed by a processor of a management node, cause the processor to:
retrieve historical resource usage data associated with a workload running on a host;
divide the historical resource usage data into a plurality of pools with each pool comprising a predefined number of resource usage statistics;
determine a statistical representative corresponding to each of the pools, wherein each statistical representative is to represent the predefined number of resource usage statistics in a corresponding one of the pools;
monitor and/or manage the workload using the statistical representatives; and
dynamically update the statistical representatives corresponding to the pools upon receiving new resource usage data, wherein dynamically updating the statistical representatives comprises:
receiving a first incoming resource usage statistic associated with the workload;
placing the first incoming resource usage statistic in a new pool;
determining a new statistical representative for the new pool; and
updating the new statistical representative corresponding to the new pool for each of incoming resource usage statistics until a number of the incoming resource usage statistics in the new pool is less than the predefined number of resource usage statistics.

14. The non-transitory machine-readable storage medium of claim 13, further comprising:
dynamically updating the statistical representatives corresponding to the plurality of pools by storing the new statistical representative corresponding to the new pool in memory associated with the management node and discarding an oldest statistical representative from the memory when the number of incoming resource usage statistics in the new pool is equal to the predefined number of resource usage statistics.

* * * * *